(12) United States Patent
Zheng et al.

(10) Patent No.: US 11,241,798 B1
(45) Date of Patent: Feb. 8, 2022

(54) SOURCE AUTOMATIC MOUNTING AND DEMOUNTING CONTROL SYSTEM AND METHOD FOR NUCLEAR LOGGING INSTRUMENTS

(71) Applicant: Institute of Geology and Geophysics, Chinese Academy of Sciences, Beijing (CN)

(72) Inventors: Jian Zheng, Beijing (CN); Qingyun Di, Beijing (CN); Wenxuan Chen, Beijing (CN); Wenxiu Zhang, Beijing (CN); Wenqiang Yuan, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/352,324

(22) Filed: Jun. 20, 2021

(30) Foreign Application Priority Data

Jul. 21, 2020 (CN) .......................... 202010706784.5

(51) Int. Cl.
*G06F 17/00* (2019.01)
*B25J 11/00* (2006.01)
(Continued)

(52) U.S. Cl.
CPC .............. *B25J 11/00* (2013.01); *B25J 13/085* (2013.01); *B25J 13/086* (2013.01);
(Continued)

(58) Field of Classification Search
CPC ........ B25J 11/00; B25J 13/085; B25J 13/086; B25J 15/0019; B25J 19/023; G01V 5/04
(Continued)

(56) References Cited

U.S. PATENT DOCUMENTS 5,025,150 A * 6/1991 Oldham ................... G01T 7/00
250/253
5,345,809 A * 9/1994 Corrigan .............. G01N 1/2214
250/286
(Continued)

FOREIGN PATENT DOCUMENTS

CN 207267151 U 4/2018
CN 207840821 U 9/2018
(Continued)

*Primary Examiner* — Ronnie M Mancho
(74) *Attorney, Agent, or Firm* — Novick, Kim & Lee, PLLC; Allen Xue

(57) ABSTRACT

A mounting and demounting control system is used for installing a radioactive source in nuclear logging instruments. In this system, a tail end of a truss manipulator is fixedly provided with a worktable through a bolt, a left side of an upper surface of the worktable is provided with a source capsule mounting and demounting manipulator, a right side is provided with a compression screw mounting and demounting manipulator, and the upper surface of the worktable close to the inner side of the two manipulators is respectively provided with opposed photoelectric sensors through bolts; four corners of the truss manipulator are fixed to a support through bolts, a beam is fixed between two legs at the front side of the support through bolts; and a positioning device is placed near the front of the support, and an upper part of positioning device is fixedly provided with an instrument.

6 Claims, 5 Drawing Sheets

(51) Int. Cl.
  *B25J 15/00* (2006.01)
  *B25J 13/08* (2006.01)
  *G01V 5/04* (2006.01)
  *B25J 19/02* (2006.01)
(52) U.S. Cl.
  CPC ......... *B25J 15/0019* (2013.01); *B25J 19/023* (2013.01); *G01V 5/04* (2013.01)
(58) Field of Classification Search
  USPC ........................................................ 700/253
  See application file for complete search history.

(56) References Cited

U.S. PATENT DOCUMENTS

| | | | |
|---|---|---|---|
| 2016/0045841 A1* | 2/2016 | Kaplan ................. | B01D 53/48 429/49 |
| 2018/0255632 A1* | 9/2018 | Navarro-Sorroche ... | G01V 5/10 |

FOREIGN PATENT DOCUMENTS

| | | | | |
|---|---|---|---|---|
| CN | 109732304 A | 5/2019 | | |
| CN | 210232161 U | 4/2020 | | |
| EP | 0323773 B1 * | 6/1992 | ............... | G01V 5/12 |
| JP | H08309627 A | 11/1996 | | |
| WO | WO-2017008078 A2 * | 1/2017 | ............. | G01V 5/107 |

* cited by examiner

SOURCE AUTOMATIC MOUNTING AND DEMOUNTING CONTROL SYSTEM AND METHOD FOR NUCLEAR LOGGING INSTRUMENTS

FIELD

The present disclosure belongs to the technical field of oil and gas logging, and in particular relates to a source automatic mounting and demounting control system and method for nuclear logging instruments.

BACKGROUND

At present, in the field of oil and gas logging, neutron and gamma-ray nuclear logging instruments are widely used in project sites. Currently, radioactive source mounting and demounting for nuclear logging instruments use manual mounting and demounting methods, which cause great harm to the health of operators due to high activity of radioactive sources used for logging and calibration. In order to reduce the harm of the radioactive sources to the operators as much as possible, the operators generally need to wear protective equipment such as lead clothes and lead gloves and use special lengthened source mounting and demounting tools to perform source mounting and demounting operations. The use of the protective equipment and the source mounting and demounting tools can reduce the irradiation received by the operators to some extent, but there is still a fundamental problem of insufficient shielding and protection capabilities. In the meanwhile, in order to shorten the total working time, considerable requirements are brought forward for the proficiency of the operators.

According to the three elements of radiation protection, in the source mounting and demounting process, the operators should keep the distance as far as possible from the source, keep a shorter operating time and adopt necessary protective measures. Therefore, the operators use special lengthened source mounting and demounting tools and wear lead clothes and lead gloves when performing source mounting and demounting operations. Research reports have pointed out that assuming that the operator has used the simulated source to perform many effective trainings and has considerable operating experience, the simulated calculation is carried out under such conditions. The radiation dose received by the operator who operates the 18Ci Am—Be neutron source once is about 1.8-2.3 mSv, and the radiation dose received by the operator who operates the 2Ci Cs-137 gamma-ray source once is about 0.6-1.0 mSv. In Chinese basic health standards for radiological protection, the limits recommended by ICRP are used. In order to prevent random effects, it is stipulated that when the whole body of a radioactive worker is uniformly irradiated, the annual dose equivalent shall not exceed 50 mSv (5 rem), and the average annual dose equivalent for 5 consecutive years shall not exceed 20 mSv (2 rem). Apparently, the manual method of mounting and demounting radioactive sources makes the operators receive a large dose of strong source irradiation in a short time. It should be noted that in the production, acceptance, on-site calibration and logging process of radioactive instruments, the frequency of the radioactive source mounting and demounting operations is irregular, and there are often concentrated operations in a short time. At this time, the exposure received by the operators will increase exponentially on this basis. Therefore, for such source mounting and demounting operators, rotating work and strict monitoring of personal exposure doses are currently adopted to reduce the harm to the health of operators caused by radiation. These have virtually increased labor and management costs.

In addition, the intensity of irradiation received by the operator is inversely proportional to the square of the distance from the source. Therefore, the operators use a special lengthened source mounting and demounting tool to perform operations in the source mounting and demounting process, and generally, the length of the tool is 800-1000 mm. Due to the long overhang of the tool, it is inconvenient for the operator to operate. At the same time, in order to minimize the unnecessary waste of time in the process, the tool is usually of a two-end type, that is, the tightening and demounting tools are integrated at the two ends of the long rod, and the tool must be turned over during operation, which makes the operation complicated.

Based on the above, the prior art has the following problems:

(1) The manual mounting and demounting method is used, so the short-time strong irradiation will cause great harm to the health of the operators.

(2) The existing protective equipment and source mounting and demounting tools are complicated to operate and not easy to use.

Difficulties in solving the above technical problems: the working manner is changed from manual source mounting and demounting to mechanical and automatic source mounting; the sizes of the source capsule, the source screw, the compression screw and the like are small, which is not conducive to modification to automation; and for different types of instruments, the source mounting positions are different, so the compatibility with different types of instruments must be considered.

Meanings for solving the above technical problems: the possibility of operators being directly exposed to strong sources is fundamentally avoided, and the health of the operators is protected; and the labor and management costs of related units or companies are reduced.

SUMMARY

In view of the problems in the prior art, the present disclosure provides a source automatic mounting and demounting control system and method applicable to 37/57 series density logging instruments.

The present disclosure is realized by providing a source automatic mounting and demounting control system for nuclear logging instruments, including:

a truss manipulator, configured to realize a movement along an X/Y/Z axis in a support space;

a source capsule mounting and demounting manipulator, configured to realize automatic mounting and demounting of a source capsule;

a compression screw mounting and demounting manipulator, configured to realize automatic mounting and demounting of a compression screw;

an auxiliary tooling, configured to assist the source capsule mounting and demounting manipulator and the compression screw mounting and demounting manipulator in completion of automatic mounting and demounting;

a positioning device, configured to finely adjust an included angle during instrument mounting; and a control platform, configured to control the truss manipulator, the source capsule mounting and demounting manipulator, the compression screw mounting and demounting manipulator, the auxiliary tooling and the positioning device;

wherein the truss manipulator is movably arranged on a top part of a support through a slide rail and is movable forward and backward along the slide rail, a lower end of the truss manipulator is provided with a worktable capable of moving up and down, and the source capsule mounting and demounting manipulator and the compression screw mounting and demounting manipulator are arranged on the worktable;

the positioning device is arranged at a front end of the support, the auxiliary tooling is arranged on a beam of the support located between the positioning device and the worktable, and an end of the beam close to the auxiliary tooling side leg is provided with a third camera; and the control platform is in a control connection with the truss manipulator, the source capsule mounting and demounting manipulator, the compression screw mounting and demounting manipulator, the auxiliary tooling, the positioning device and the third camera.

Further, the compression screw mounting and demounting manipulator includes a first drive motor, a first single reducing mechanism, a first torque sensor, a first adapter, a first proximity photoelectric sensor, a compression screw mounting and demounting sleeve and a first camera;

an output end of the first drive motor is connected to one end of the first single reducing mechanism, the other end of the first single reducing mechanism is connected to one end of the first torque sensor, and the other end of the first torque sensor is connected to one end of the first adapter;

a middle part of the first adapter is provided with the first proximity photoelectric sensor, the other end of the first adapter is fixedly connected to one end of the compression screw mounting and demounting sleeve, a first support is arranged outside the first torque sensor, the first support is fixed to one end of the worktable, and a top part of the first support is provided with the first camera; and the first drive motor, the first torque sensor, the first proximity photoelectric sensor and the first camera are connected to the control platform.

Further, the source capsule mounting and demounting manipulator includes a second drive motor, a second single reducing mechanism, a second torque sensor, a second adapter, a second proximity photoelectric sensor, a source capsule mounting and demounting sleeve and a second camera;

wherein an output end of the second drive motor is connected to one end of the second single reducing mechanism, the other end of the second single reducing mechanism is connected to one end of the second torque sensor, and the other end of the second torque sensor is connected to one end of the second adapter;

the second adapter is provided with the second proximity photoelectric sensor, the other end of the second adapter is fixedly connected to one end of the source capsule mounting and demounting sleeve, a spring is arranged between the source capsule mounting and demounting sleeve and the second adapter, and the source capsule mounting and demounting sleeve is movable forward and backward relative to the second adapter;

a second support is arranged outside the torque sensor, the second support is fixed to the other end of the worktable, and a top part of the second support is provided with the second camera; and the second drive motor, the second torque sensor, the second proximity photoelectric sensor and the second camera are connected to the control platform.

Further, the auxiliary tooling includes a pair of first opposed photoelectric sensors, a pair of second opposed photoelectric sensors and an auxiliary tooling body, the first opposed photoelectric sensor and the second opposed photoelectric sensor are respectively mounted on the worktable and the auxiliary tooling body located on one side of the source capsule mounting and demounting manipulator and the compression screw mounting and demounting manipulator, the first opposed photoelectric sensor and the second opposed photoelectric sensor are at the same level, one side of the second opposed photoelectric sensor located on the auxiliary tooling body is provided with a spare compression screw, and the other side is provided with a source container.

Further, the positioning device includes a fixed frame, a rotating structure, a pressure pump head and a small hydraulic station, wherein an upper part of the fixed frame is provided with the rotating structure, the rotating structure is provided with the pressure pump head, and the pressure pump head is connected to the small hydraulic station through a hydraulic pipeline; and the rotating structure is configured to perform fine adjustment when the included angle of the instrument is not correct, and the angle adjustment range is ±180 degrees.

Further, a magnet is also arranged in the compression screw sleeve.

Another objective of the present disclosure is to provide a source automatic mounting and demounting control method for nuclear logging instruments of the above source automatic mounting and demounting control system for nuclear logging instruments. The method specifically includes the following steps:

firstly, the forward and backward movement of the source capsule mounting and demounting sleeve is capable of making the proximity photoelectric sensor generate two signals 0 or 1;

when a screw rod on the source capsule mounting and demounting sleeve is screwed in a source capsule, the source capsule mounting and demounting sleeve is brought into contact with an end surface of the source capsule, then the worktable moves forward 5 mm as a whole, a spring force is applied between the source capsule mounting and demounting sleeve and the second adapter, the source capsule mounting and demounting sleeve moves backward relative to the second adapter, and the signal of the proximity photoelectric sensor is set to "1"; and when a motor drives the source capsule mounting and demounting sleeve to rotate and be screwed into a threaded hole of the source capsule, under the action of the spring force, the source capsule mounting and demounting sleeve moves forward while making a spiral movement, and the movement makes the signal of the proximity photoelectric sensor set to "0", that is, the screw-in is successful.

Further, the source automatic mounting and demounting control method for nuclear logging instruments further includes:

in source mounting, preparations before source mounting are completed; the source capsule mounting and demounting manipulator advances fast to Point 2; the source capsule mounting and demounting manipulator advances slow to Point 3; the source capsule mounting and demounting manipulator advances slow 5 mm, a spring force is applied to the source capsule mounting and demounting sleeve, and the signal of the proximity photoelectric sensor is set to "1"; the source capsule mounting and demounting manipulator drives the source capsule mounting and demounting sleeve to rotate and start screw-in; the source capsule mounting and demounting sleeve moves forward while making a spiral movement during the screw-in; the movement of the source capsule mounting and demounting sleeve makes the signal of the sensor set to "0", that is, the screw-in is successful;

the source capsule mounting and demounting manipulator retreats slow to Point 2; the source capsule mounting and demounting manipulator advances fast to Point 4; the source capsule mounting and demounting manipulator advances slow to Point 1; the source capsule mounting and demounting manipulator advances slow 5 mm, a spring force is applied to the source capsule mounting and demounting sleeve, and the signal of the proximity photoelectric sensor is set to "1"; the source capsule mounting and demounting manipulator drives the source capsule mounting and demounting sleeve to rotate and start screw-out; the source capsule mounting and demounting sleeve moves backward while making a spiral movement during the screw-out; the movement of the source capsule mounting and demounting sleeve makes the signal of the sensor set to "0", that is, the screw-out is successful;

the compression screw mounting and demounting manipulator advances fast to Point 8; the compression screw mounting and demounting manipulator advances slow to Point 9; the compression screw mounting and demounting manipulator advances slow 5 mm, a spring force is applied to the screw mounting and demounting sleeve, and the signal of the proximity photoelectric sensor is set to "1"; the compression screw mounting and demounting manipulator drives the screw mounting and demounting sleeve to rotate and start screw-in; the compression screw moves forward while making a spiral movement during the screw-in; the movement of the screw mounting and demounting sleeve makes the signal of the sensor set to "0", proving that the screw-in is successful; the compression screw mounting and demounting manipulator retreats slow to Point 8; and the worktable returns to the origin, thereby completing all the source mounting operations.

Further, the source automatic mounting and demounting control method for nuclear logging instruments further includes:

in demounting, the instrument is fixed; the compression screw mounting and demounting manipulator advances fast until the end surface of the sleeve is in contact with the end surface of the compression screw; the compression screw mounting and demounting manipulator advances slow 6 mm, a spring force is applied to the screw mounting and demounting sleeve, and the signal of the proximity photoelectric sensor is set to "1"; the compression screw mounting and demounting manipulator drives the screw mounting and demounting sleeve to rotate to recognize a nut; if the nut is recognized successfully, the sleeve moves forward under the action of the spring force, the front end surface is tightened with an end surface of a bolt, and at the same time, the signal of the proximity photoelectric sensor is set to "0", that is, the nut is recognized successfully;

the compression screw mounting and demounting manipulator drives the screw mounting and demounting sleeve to rotate to screw out the compression screw; the spiral movement makes the sleeve move backward, and the signal of the proximity photoelectric sensor is set to "1", proving that the compression screw is screwed out successfully; the compression screw mounting and demounting manipulator retreats 20 mm to a safe distance; the demounting of the compression screw is completed; and the process of demounting the source capsule and placing the source capsule in the source container is the same as the source mounting process.

The present disclosure further provides usage of the above source automatic mounting and demounting control system for nuclear logging instruments in oil and gas logging.

Based on the above, the present disclosure has the following advantages and beneficial effects: The present disclosure is applicable to 37/57 series gamma-ray logging instruments. The control system is mainly composed of the truss manipulator, the worktable, the positioning device, the auxiliary tooling, the monitoring camera, the remote control platform and the like. The present disclosure is applicable to a calibration center, an instrument repair workshop and other occasions where the instruments need to be operated with the source. When performing the source mounting and demounting operations, the operator can remotely perform monitoring and operations in the source mounting and demounting process, thereby fundamentally avoiding the possibility of the operators being exposed to strong sources; the system can realize fully automatic operations, and can also complete the source mounting and demounting operations by controlling the axes by the operator through a handle; and for different types of instruments, the positions of mounting holes of the source capsule are not the same, and by changing coordinates of the mounting hole relative to the coordinate system of the truss manipulator, the system can be universal for different types of instruments.

According to the present disclosure, in the source mounting and demounting process, the operator is allowed to perform monitoring and operations away from the site, thereby fundamentally avoiding the possibility of the operator being exposed to strong sources; for a definite type of instruments, the system can realize fully automatic operation, thereby minimizing the dependence of the system on the operators; and for different types of instruments, the positions of mounting holes of the source capsule are not the same, and by changing coordinates of the mounting hole relative to the coordinate system of the truss manipulator, the system can be universal for different types of instruments.

1. truss manipulator; 2. monitoring camera; 3. auxiliary tooling; 4. worktable; 5. compression screw mounting and demounting manipulator; 6. source capsule mounting and demounting manipulator; 7. positioning device; 8. instrument; 9. source capsule; 10. source capsule screw; 11. original compression screw; 12. compression screw; 13. second camera; 14. second drive motor; 15. second single reducing mechanism; 16. second torque sensor; 17. second proximity photoelectric sensor; 18. second adapter; 19. source capsule mounting and demounting sleeve; 20. second opposed photoelectric sensor; 21. compression screw mounting and demounting sleeve; 22. magnet; 23. source container; 24. first opposed photoelectric sensor; 25. spare compression screw; 26. fixed frame; 27. rotating device; 28. pressure pump head; 29. small hydraulic station; 30. pin axis; 31. first camera; 32. first drive motor; 33. first single reducing mechanism; 34. first torque sensor; 35. first proximity photoelectric sensor; 36. first adapter.

DETAILED DESCRIPTION OF THE EMBODIMENTS

In order to further understand the content, features and effects of the present disclosure, the following embodiments are listed and described in detail in conjunction with the accompanying drawings below.

In view of the problems in the prior art, the present disclosure provides a source automatic mounting and demounting control system and method for nuclear logging instruments. The present disclosure will be described in detail below with reference to the accompanying drawings.

The source automatic mounting and demounting control system for nuclear logging instruments provided by an embodiment of the present disclosure is mainly composed of a truss manipulator, a worktable, a positioning device, an auxiliary tooling, cameras and the like. Special manipulators are arranged on the worktable and configured to mount a source capsule and a compression screw.

Figure 1:
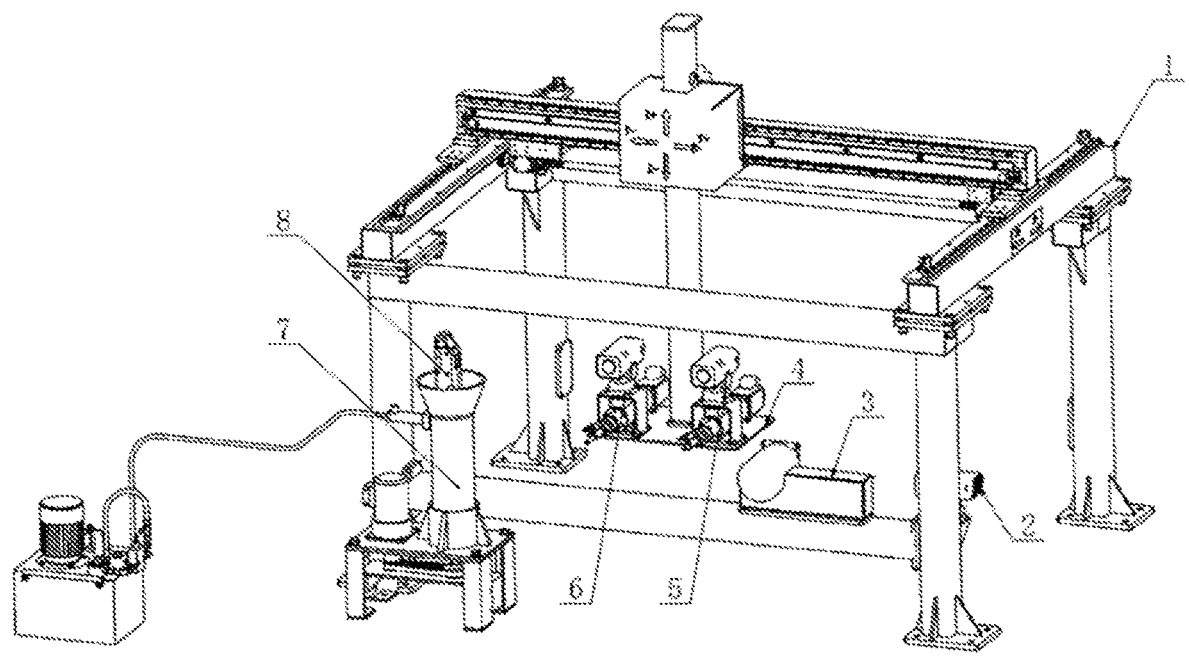
FIG. 1 is a schematic structural diagram of a source automatic mounting and demounting system according to the present disclosure.

As shown in FIGS. 1-7, the source automatic mounting and demounting control system for nuclear logging instruments provided by the embodiment of the present disclosure includes a truss manipulator 1, a tail end of the truss manipulator 1 is fixedly provided with a worktable 4 through a bolt, a left side of an upper surface of the worktable 4 is provided with a source capsule mounting and demounting manipulator 6, a right side is provided with a compression screw mounting and demounting manipulator 5, and the upper surface of the worktable 4 close to the inner side of the two manipulators is respectively provided with opposed photoelectric sensors 20 through bolts; a beam is fixed between two legs at the front side of a support of the truss manipulator 1 through bolts, a right side of an upper end of the beam is fixedly connected to an auxiliary tooling 3, and a rear side of the leg close to the auxiliary tooling 3 side is provided with a monitoring camera 2 through bolts; and a positioning device 7 is placed near the front of the support, and an upper part of positioning device 7 is fixedly provided with an instrument 8, as shown in FIG. 1.

Preferably, the truss manipulator 1 is a universal space three-coordinate truss manipulator capable of realizing a movement along an X/Y/Z axis in a space, and two ends of the X axis and the Y axis of the truss manipulator 1 are respectively provided with a hard limit (bumper block) and a limit switch.

Preferably, the compression screw mounting and demounting manipulator 5 includes a first drive motor 32, a front end of the first drive motor 32 is fixedly provided with a first single reducing mechanism 33 through bolts, the other end of the first single reducing mechanism 33 is connected to a first torque sensor 34 through bolts, the first torque sensor 34 is configured to monitor a real-time torque in the rotation process, and provide warning and logic control functions when seizure of the threads occurs and the thread is completely screwed into the end surface and tightened, the other end of the first torque sensor 34 is connected to a first adapter 36 through bolts, a middle part of the first adapter 36 is provided with a first proximity photoelectric sensor 35, the other end of the first adapter 36 is fixedly connected to a compression screw mounting and demounting sleeve 21, a magnet 22 is fixedly connected to the inside of the compression screw mounting and demounting sleeve 21, the support is arranged outside the first torque sensor 34, the support is fixed to the worktable through bolts, and a first camera 31 is fixedly connected to an upper part of the support through bolts and used for visual operations.

Figure 3:
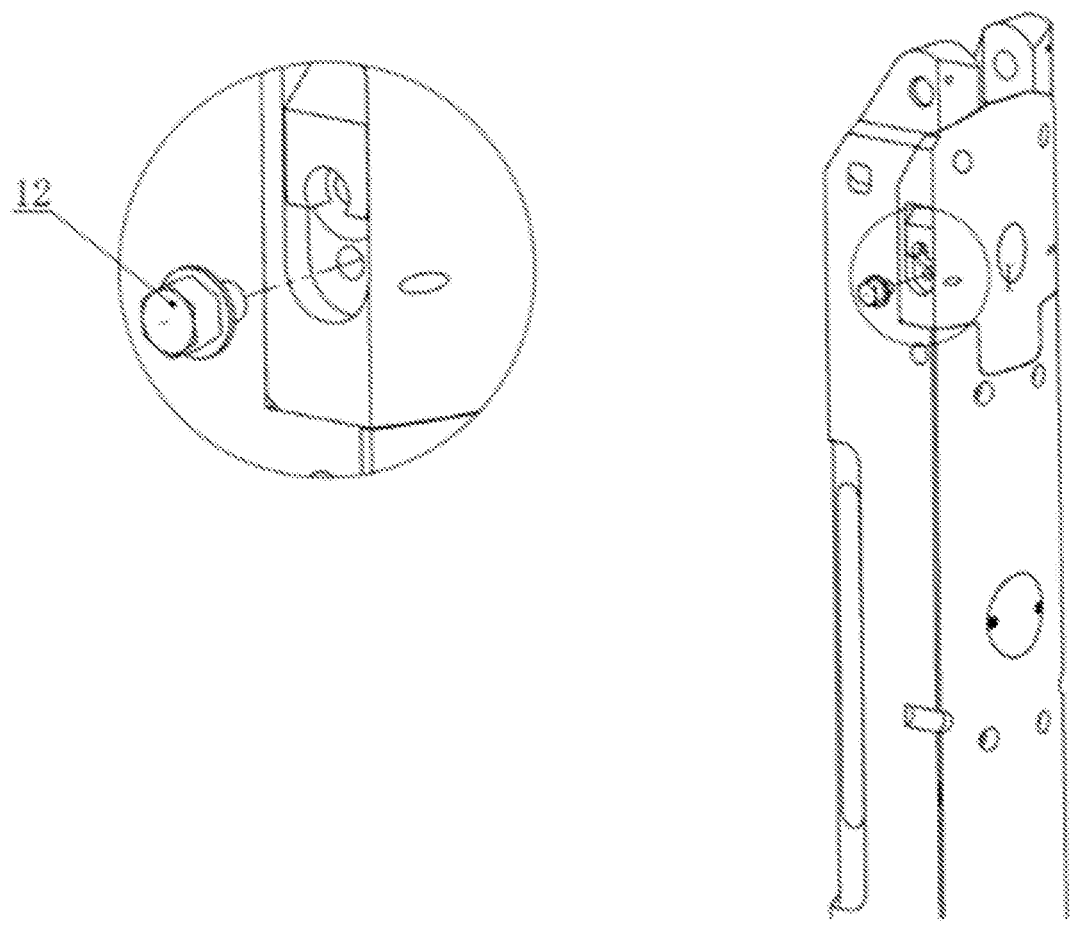
FIG. 3 is a schematic assembly diagram of a modified compression screw according to the present disclosure.
Figure 4:
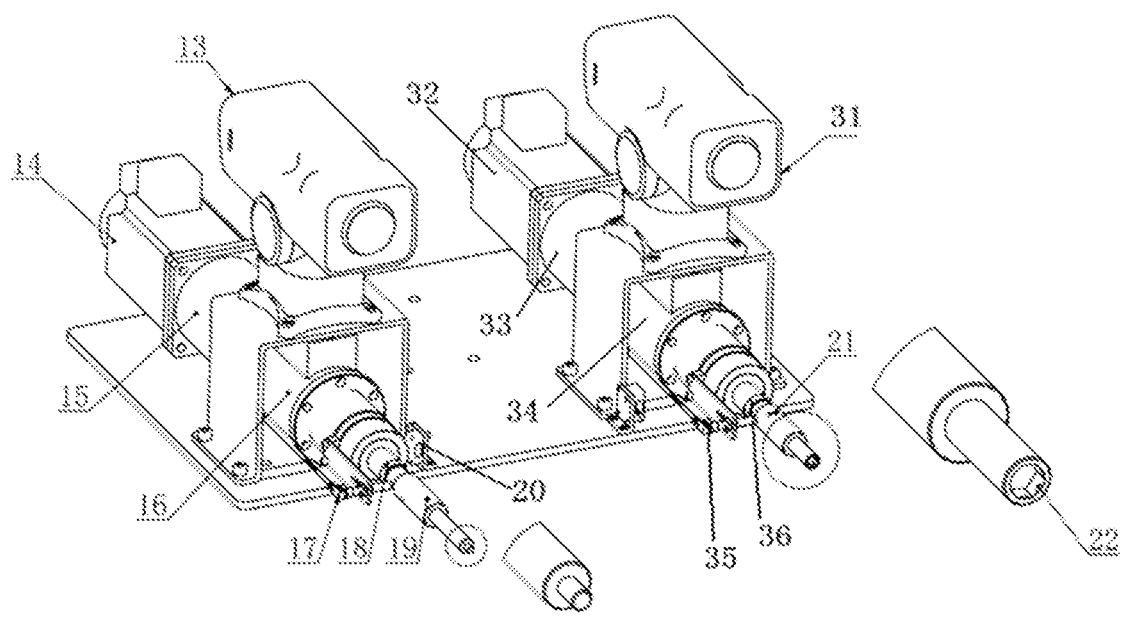
FIG. 4 is a schematic structural diagram of a worktable according to the present disclosure.
Figure 5:
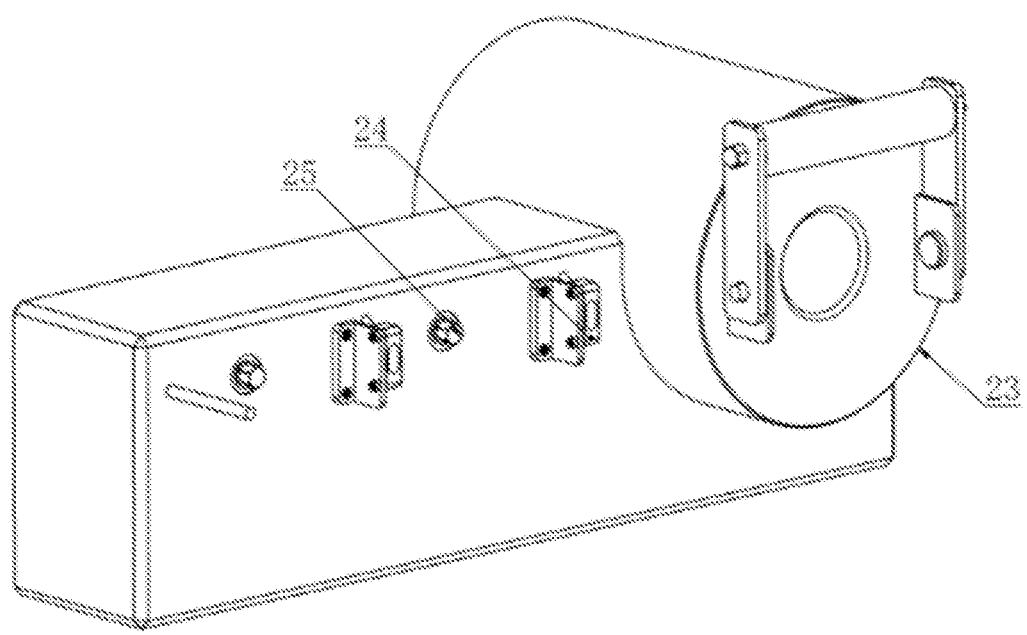
FIG. 5 is a schematic structural diagram of an auxiliary tooling according to the present disclosure.
Figure 6:
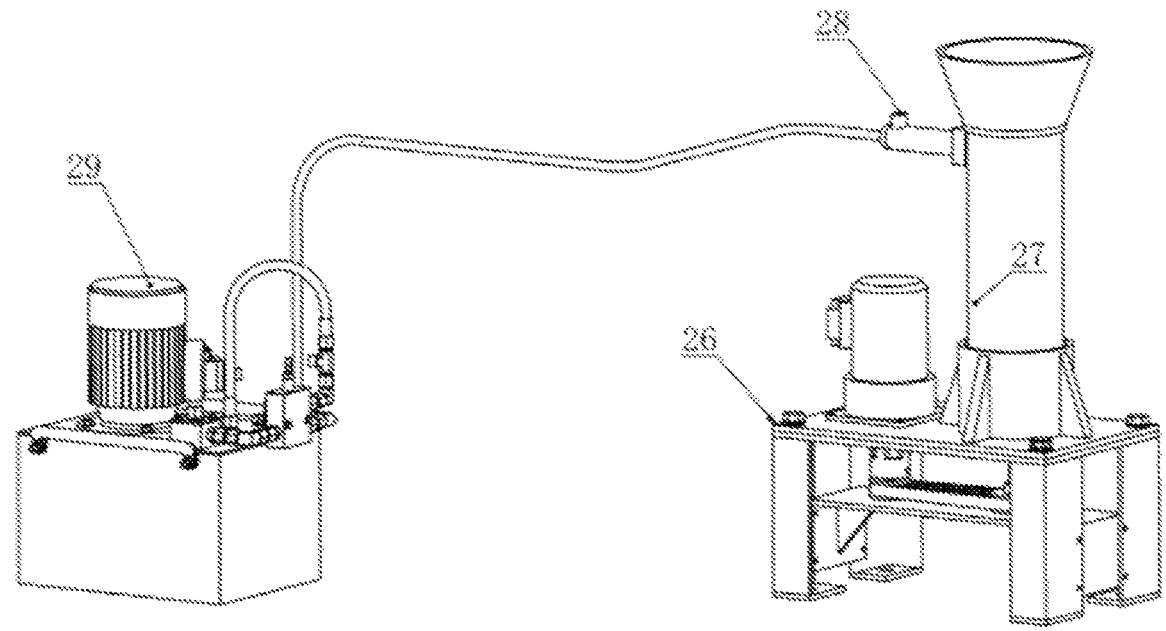
FIG. 6 is a schematic structural diagram of a positioning device according to the present disclosure.

Preferably, the source capsule mounting and demounting manipulator 6 includes a second drive motor 14, a front end of the second drive motor 14 is fixedly provided with a second single reducing mechanism 15 through bolts, the other end of the second single reducing mechanism 15 is connected to a second torque sensor 16 through bolts, the second torque sensor 16 is configured to monitor a real-time torque in the rotation process, and provide warning and logic control functions when seizure of the threads occurs and the thread is completely screwed into the end surface and tightened, the other end of the second torque sensor 16 is connected to a second adapter 18 through bolts, a middle part of the second adapter 18 is provided with a second proximity photoelectric sensor 17, the other end of the second adapter 18 is fixedly connected to a source capsule mounting and demounting sleeve 19, a support is arranged outside the second torque sensor 16, the support is fixed to the worktable through bolts, and a second camera 13 is fixedly connected to an upper part of the support through bolts and used for visual operations, as shown in FIG. 3.

Preferably, the auxiliary tooling 3 includes second opposed photoelectric sensors 24 mounted at the middle part of the rear side, which cooperate with the first opposed photoelectric sensors 20 on the compression screw mounting and demounting manipulator 5 and the source capsule mounting and demounting manipulator 6 to complete the logic control of the alignment of the manipulator with the source capsule threaded hole and the compression screw, the first opposed photoelectric sensor 20 and the second opposed photoelectric sensor 24 are at the same level, and a right side of the second opposed photoelectric sensors 24 are respectively provided with a spare compression screw 25; and a left side of the auxiliary tooling 3 is provided with a source container 23.

Preferably, the positioning device includes a fixed frame 26, an upper part of the fixed frame 26 is fixedly provided with a rotating device 27 through bolts, an upper part of the rotating device 27 is provided with a pressure pump head 28, the pressure pump head 28 is connected to a small hydraulic station 29 through a guide tube, the pressure pump head 28 clamps the instrument through hydraulic pressing force, and the rotating device can rotate within a range of ±180 degrees and perform fine adjustment when the included angle of the instrument is not correct.

The technical solution of the present disclosure will be further described in conjunction with the embodiments.

Embodiment 1

Figure 2:
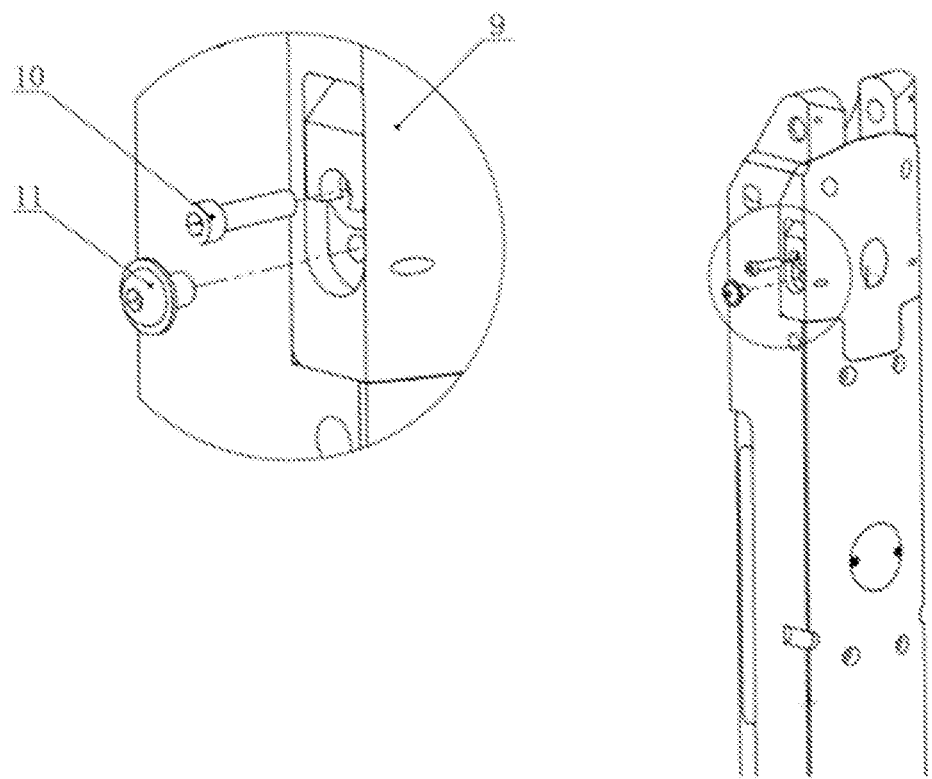
FIG. 2 is a schematic assembly diagram of a source capsule of a 37/57 series gamma-ray logging instrument according to the present disclosure.

As shown in FIG. 2, a 37/57 series gamma-ray logging instrument must be equipped with a source capsule screw 10 and an original compression screw 11 at the same time during logging, but is equipped with only the source capsule screw 10 for calibration to compress the total working time during calibration and other operations. The size of the source capsule screw 10 is small and the nut is flush with the end surface of the source capsule 9 when the nut is assembled in place, which is not conducive to automatic operations. The original compression screw 11 has a round head, which is also not conducive to automatic operations. Therefore, the original compression screw 11 is modified in this system to facilitate the automation modification. The modified compression screw has an outer hexagon structure. Correspondingly, the compression screw mounting and dismounting sleeve 21 has an outer hexagon sleeve structure, and the inside of the sleeve is equipped with a magnet for preventing the screw from falling in the movement process.

Embodiment 2

Figure 7:
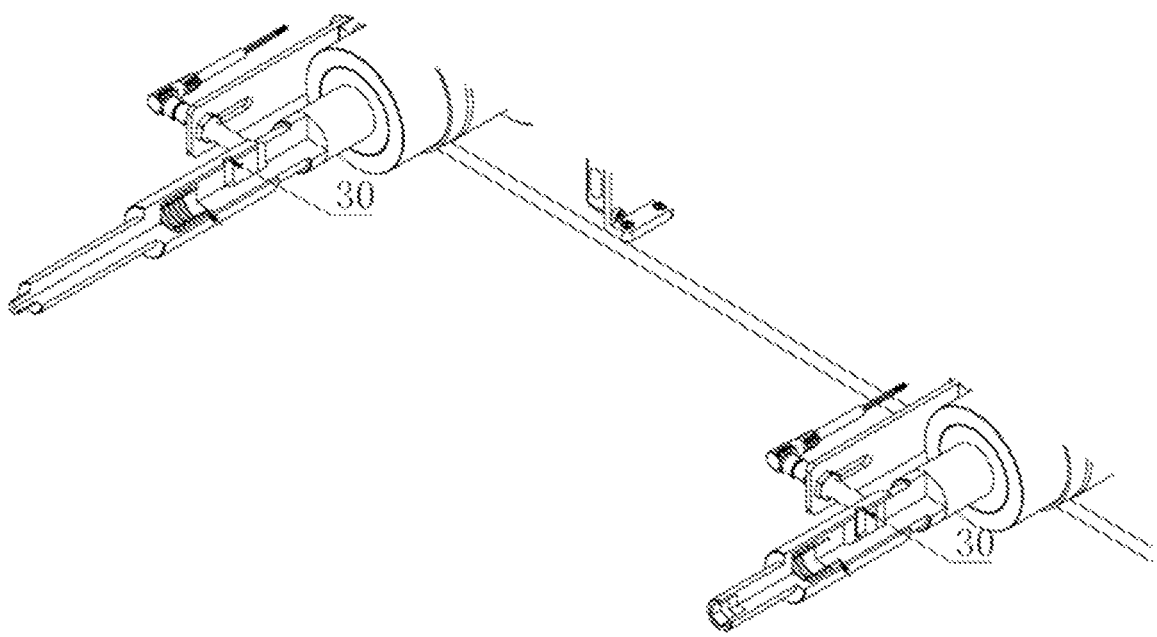
FIG. 7 is a sectional structural diagram of sleeves of manipulators 1, 2 according to the present disclosure.

As shown in FIG. 7, a spring is arranged between the sleeve and the adapter, the sleeve is movable forward and backward relative to the adapter 18, and the logic control of a program is completed through the movement of the sleeve in cooperation with the proximity photoelectric sensor 17. When the sleeve starts screw-in/screw-out, if the proximity photoelectric sensor 17 still does not send a signal after a delay of 20 s, it is considered that the sleeve is not aligned, and the system outputs a warning message.

FIG. 7 provides an assembly structure of a compression screw mounting and demounting sleeve 21 and a source capsule mounting and demounting sleeve 19, and the source capsule mounting and demounting sleeve 19 is taken as an example for description. As shown in the figure, the spring is arranged between the source capsule mounting and demounting sleeve 19 and the second adapter 18, and the source capsule mounting and demounting sleeve 19 is movable forward and backward relative to the second adapter 18. The second proximity photoelectric sensor 17 is mounted on the adapter 18, and the forward and backward movement of the source capsule mounting and demounting sleeve 19 is capable of making the proximity photoelectric sensor 17 generate two different signals 0 or 1. Specifically, when a screw rod on the source capsule mounting and demounting sleeve 19 is screwed in a source capsule 9, the source capsule mounting and demounting sleeve 19 is firstly brought into contact with an end surface of the source capsule 9, then the worktable 4 moves forward 5 mm as a whole, a spring force is applied between the source capsule mounting and demounting sleeve 19 and the second adapter 18, the source capsule mounting and demounting sleeve 19 moves backward relative to the second adapter 18, and the signal of the second proximity photoelectric sensor 17 is set to "1". When the second drive motor 14 drives the source capsule mounting and demounting sleeve 19 to rotate and be screwed into a threaded hole of the source capsule 9, under the action of the spring force, the source capsule mounting and demounting sleeve 19 moves forward while making a spiral movement, and the movement makes the signal of the second proximity photoelectric sensor 17 set to "0", proving that the screw-in is successful.

For a certain specific type of instruments, the system can completely realize fully automatic movement. When seizure of the threads occurs and the torque sensor 16 outputs a warning, or when the nut recognition fails for 3 consecutive times, the system automatically switches to a semi-automatic mode. At this time, the operator is required to finely adjust coordinates of the source capsule mounting and demounting manipulator 6.

Embodiment 3

In order to facilitate the description of the source mounting and demounting operation process, some key points of the system movement are defined as follows:

Point 1: the center point of the front end surface of the source capsule mounting and demounting sleeve 19, representing the real-time position of the source capsule mounting and demounting manipulator 6 in the operating process; Point 2: the retreat point before the contact point between the source capsule mounting and demounting sleeve 19 and the source capsule 9 at the auxiliary tooling (fixed point); Point 3: the contact point between the source capsule mounting and demounting sleeve 19 and the source capsule 9 at the auxiliary tooling (fixed point); Point 4: the retreat point before the contact point between the source capsule mounting and demounting sleeve 19 (with the source capsule) and the instrument 8 (fixed point); Point 5: the contact point between the source capsule mounting and demounting sleeve 19 (with the source capsule) and the instrument 8 (fixed point); Point 6: the coordinate point where the source capsule mounting and demounting sleeve 19 mounts the source capsule 9 into the source cabin (fixed point); Point 7: the center point of the front end surface of the screw mounting and demounting sleeve 21 (with the compression screw), representing the real-time point of the compression screw mounting and demounting manipulator 5 in the operating process; Point 8: the retreat point before the contact point between the screw mounting and demounting sleeve 21 (with the compression screw) and the instrument 8; and Point 9: the contact point between the screw mounting and demounting sleeve 21 (with the compression screw) and the instrument 8.

1. Source Mounting Process

Preparations before source mounting are completed (the instrument is fixed, and the compression screw is previously mounted on the screw mounting and demounting sleeve 21); the source capsule mounting and demounting manipulator 6 advances fast to Point 2; the source capsule mounting and demounting manipulator 6 advances slow to Point 3; the source capsule mounting and demounting manipulator 6 advances slow 5 mm, a spring force is applied to the source capsule mounting and demounting sleeve 19, and the signal of the proximity photoelectric sensor is set to "1"; the source capsule mounting and demounting manipulator 6 drives the source capsule mounting and demounting sleeve 19 to rotate and start screw-in; the source capsule mounting and demounting sleeve 19 moves forward while making a spiral movement during the screw-in; the movement of the source capsule mounting and demounting sleeve 19 makes the signal of the proximity photoelectric sensor set to "0", proving that the screw-in is successful; the source capsule mounting and demounting manipulator 6 retreats slow to Point 2; the source capsule mounting and demounting manipulator 6 advances fast to Point 4; the source capsule mounting and demounting manipulator 6 advances slow to Point 1; the source capsule mounting and demounting manipulator 6 advances slow 5 mm, a spring force is applied to the source capsule mounting and demounting sleeve 19, and the signal of the proximity photoelectric sensor is set to "1"; the source capsule mounting and demounting manipulator 6 drives the source capsule mounting and demounting sleeve 19 to rotate and start screw-out; the source capsule mounting and demounting sleeve 19 moves backward while making a spiral movement during the screw-out; the movement of the source capsule mounting and demounting sleeve 19 makes the signal of the proximity photoelectric sensor set to "0", proving that the screw-out is successful; the compression screw mounting and demounting manipulator 5 advances fast to Point 8; the compression screw mounting and demounting manipulator 5 advances slow to Point 9; the compression screw mounting and demounting manipulator 5 advances slow 5 mm, a spring force is applied to the screw mounting and demounting sleeve 21, and the signal of the proximity photoelectric sensor is set to "1"; the compression screw mounting and demounting manipulator 5 drives the screw mounting and demounting sleeve 21 to rotate and start screw-in; the compression screw moves forward while making a spiral movement during the screw-in; the movement of the screw mounting and demounting sleeve 21 makes the signal of the proximity photoelectric sensor set to "0", proving that the screw-in is successful; the compression screw mounting and demounting manipulator 5 retreats slow to Point 8; and the worktable returns to the origin, thereby completing all the source mounting operations.

2. Source Demounting Process

The instrument is fixed; the compression screw mounting and demounting manipulator 5 advances fast until the end surface of the sleeve is in contact with the end surface of the compression screw; the compression screw mounting and demounting manipulator 5 advances slow 6 mm, a spring force is applied to the screw mounting and demounting sleeve 21, and the signal of the proximity photoelectric sensor is set to "1"; the compression screw mounting and demounting manipulator 5 drives the screw mounting and demounting sleeve 21 to rotate to recognize a nut; if the nut is recognized successfully, the sleeve moves forward under the action of the spring force, the front end surface is tightened with an end surface of a bolt, and at the same time, the signal of the proximity photoelectric sensor is set to "0", proving that the nut is recognized successfully; the compression screw mounting and demounting manipulator 5 drives the screw mounting and demounting sleeve 21 to rotate to screw out the compression screw; the spiral movement makes the sleeve move backward, and the signal of the proximity photoelectric sensor is set to "1", proving that the compression screw is screwed out successfully; the compression screw mounting and demounting manipulator 5 retreats 20 mm to a safe distance; the demounting of the compression screw is completed; and the process of demounting the source capsule and placing the source capsule in the source container is the same as the source mounting process, and will not be repeated here.

Embodiment 4

According to the analog simulation result, preferably, this embodiment discloses a preferred application example.

1. Size Design

Preferably, the length of travel of the truss manipulator along the X axis is 1000 mm, the length of travel along the Y axis is 1500 mm, and the length of travel along the Z axis is 800 mm; and within such ranges of the lengths of travel, the system is well compatible with the currently common 37/57 series density instruments and on-site tooling equipment.

Preferably, the nut of the compression screw 12 has an outer hexagon structure, and has an inscribed circle diameter of Φ10 and a nut height of 8 mm. It is verified that when a strong magnet is placed inside the compression screw mounting and demounting sleeve 21, the compression screw 12 can maintain a good spatial pose during the movement, screw-in and screw-out, which can effectively reduce the risk of falling.

2. Tightening Torque Design

The forms of the thread of the source capsule and the thread of the compression screw are both #10-32, and a tightening head at the front end of the source capsule mounting and demounting sleeve 19 is made of 304 stainless steel. According to the analog simulation results, a tightening torque of 8-10 N. m can ensure a sufficient wedging force generated between the source capsule and the tightening head, so that the source capsule maintains a definite pose in space.

The above description is only preferred embodiments of the present disclosure and is not intended to limit the present disclosure in any form. Any simple variations, equivalent changes and modifications made to the above embodiments based on the technical essence of the present disclosure fall within the scope of the technical solutions of the present disclosure.

What is claimed is:

1. A source automatic mounting and demounting control system for nuclear logging instruments, comprising:
   a truss manipulator, configured to realize a movement along an X/Y/Z axis in a support space;
   a source capsule mounting and demounting manipulator, configured to realize automatic mounting and demounting of a source capsule;
   a compression screw mounting and demounting manipulator, configured to realize automatic mounting and demounting of a compression screw;
   an auxiliary tooling, configured to assist the source capsule mounting and demounting manipulator and the compression screw mounting and demounting manipulator in completion of automatic mounting and demounting;
   a positioning device, configured to adjust an included angle during instrument mounting; and
   a control platform, configured to control the truss manipulator, the source capsule mounting and demounting manipulator, the compression screw mounting and demounting manipulator, the auxiliary tooling and the positioning device.

2. The source automatic mounting and demounting control system for nuclear logging instruments according to claim 1, wherein the truss manipulator is movably arranged on a top part of a support through a slide rail and is movable forward and backward along the slide rail, a lower end of the truss manipulator is provided with a worktable capable of moving up and down, and the source capsule mounting and demounting manipulator and the compression screw mounting and demounting manipulator are arranged on the worktable;
   the positioning device is arranged at a front end of the support;
   the auxiliary tooling is arranged on a beam of the support located between the positioning device and the worktable, and an end of the beam close to the auxiliary tooling side leg is provided with a third camera; and
   the control platform is in a control connection with the truss manipulator, the source capsule mounting and demounting manipulator, the compression screw mounting and demounting manipulator, the auxiliary tooling, the positioning device and the third camera.

3. The source automatic mounting and demounting control system for nuclear logging instruments according to claim 2, wherein the compression screw mounting and demounting manipulator comprises a first drive motor, a first single reducing mechanism, a first torque sensor, a first adapter, a first proximity photoelectric sensor, a compression screw mounting and demounting sleeve and a first camera;
   an output end of the first drive motor is connected to one end of the first single reducing mechanism, the other end of the first single reducing mechanism is connected to one end of the first torque sensor, and the other end of the first torque sensor is connected to one end of the first adapter;

a middle part of the first adapter is provided with the first proximity photoelectric sensor, the other end of the first adapter is fixedly connected to one end of the compression screw mounting and demounting sleeve, a first support is arranged outside the first torque sensor, the first support is fixed to one end of the worktable, and a top part of the first support is provided with the first camera; and the first drive motor, the first torque sensor, the first proximity photoelectric sensor and the first camera are connected to the control platform.

4. The source automatic mounting and demounting control system for nuclear logging instruments according to claim 3, wherein the source capsule mounting and demounting manipulator comprises a second drive motor, a second single reducing mechanism, a second torque sensor, a second adapter, a second proximity photoelectric sensor, a source capsule mounting and demounting sleeve and a second camera;

wherein an output end of the second drive motor is connected to a first end of the second single reducing mechanism, a second end of the second single reducing mechanism is connected to a first end of the second torque sensor, and a second end of the second torque sensor is connected to one end of the second adapter;

the second adapter is provided with the second proximity photoelectric sensor, the other end of the second adapter is fixedly connected to one end of the source capsule mounting and demounting sleeve, a spring is arranged between the source capsule mounting and demounting sleeve and the second adapter, and the source capsule mounting and demounting sleeve is movable forward and backward relative to the second adapter;

a second support is arranged outside the torque sensor, the second support is fixed to the other end of the worktable, and a top part of the second support is provided with the second camera; and the second drive motor, the second torque sensor, the second proximity photoelectric sensor and the second camera are connected to the control platform.

5. The source automatic mounting and demounting control system for nuclear logging instruments according to claim 4, wherein the auxiliary tooling comprises a first opposed photoelectric sensor, a second opposed photoelectric sensor and an auxiliary tooling body, and the first opposed photoelectric sensor and the second opposed photoelectric sensor are respectively mounted on the worktable and the auxiliary tooling body located on one side of the source capsule mounting and demounting manipulator and the compression screw mounting and demounting manipulator, the first opposed photoelectric sensor and the second opposed photoelectric sensor are at a same level, a first side of the second opposed photoelectric sensor located on the auxiliary tooling body is provided with a spare compression screw, and a second side is provided with a source container.

6. The source automatic mounting and demounting control system for nuclear logging instruments according to claim 5, wherein the positioning device comprises a fixed frame, a rotating structure, a pressure pump head and a small hydraulic station, wherein an upper part of the fixed frame is provided with the rotating structure, the rotating structure is provided with the pressure pump head, and the pressure pump head is connected to the small hydraulic station through a hydraulic pipeline; and the rotating structure is configured to perform fine adjustment when the included angle of the instrument is not correct, and an angle adjustment range is ±180 degrees.

\* \* \* \* \*